(12) United States Patent
Audigie et al.

(10) Patent No.: US 9,491,900 B2
(45) Date of Patent: Nov. 15, 2016

(54) DISTRIBUTION BOX FOR SINGLE-SEED SEED DRILL WITH OPEN GROOVES AND SEED DRILL USING SUCH A BOX

(71) Applicant: KUHN S.A., Saverne (FR)

(72) Inventors: Jean-Charles Audigie, Bouxwiller (FR); Julien Eberhart, Veckersville (FR)

(73) Assignee: KUHN S.A., Saverne (FR)

( * ) Notice: Subject to any disclaimer, the term of this patent is extended or adjusted under 35 U.S.C. 154(b) by 91 days.

(21) Appl. No.: 14/403,843

(22) PCT Filed: May 30, 2013

(86) PCT No.: PCT/FR2013/051210
§ 371 (c)(1),
(2) Date: Nov. 25, 2014

(87) PCT Pub. No.: WO2013/178948
PCT Pub. Date: Dec. 5, 2013

(65) Prior Publication Data
US 2015/0163990 A1    Jun. 18, 2015

(30) Foreign Application Priority Data

May 31, 2012    (FR) ...................... 12 55026

(51) Int. Cl.
*A01C 7/04*    (2006.01)
(52) U.S. Cl.
CPC ..................... *A01C 7/046* (2013.01)
(58) Field of Classification Search
CPC .............................. A01C 7/046; A01C 7/044
USPC .................. 111/183–185; 221/265, 278, 211
See application file for complete search history.

(56) References Cited

U.S. PATENT DOCUMENTS

| | | | | |
|---|---|---|---|---|
| 3,888,387 | A * | 6/1975 | Deckler ................... | A01C 7/04 111/185 |
| 4,450,979 | A * | 5/1984 | Deckler ................... | A01C 7/04 221/263 |
| 5,027,725 | A * | 7/1991 | Keeton .................... | A01C 7/04 111/184 |
| 7,854,206 | B2 * | 12/2010 | Horsch .................. | A01C 7/046 111/185 |

(Continued)

FOREIGN PATENT DOCUMENTS

DE    10 2008 037 397    4/2010

OTHER PUBLICATIONS

U.S. Appl. No. 14/402,992, filed Nov. 21, 2014, Audigie.

(Continued)

*Primary Examiner* — John G Weiss
(74) *Attorney, Agent, or Firm* — Oblon, McClelland, Maier & Neustadt, L.L.P.

(57) ABSTRACT

A distribution box for a single-seeder including a disc including radial grooves that are regularly spaced apart and open on a periphery of the disc, the disc being rotatably mounted on a horizontal axis and separating a seed reservoir from a suction device such that seeds are picked up from the reservoir by the disc via air flow by negative pressure and are held over at least part of their angular travel until they are expelled from a discharge opening. Each groove includes a suction hole smaller than a size of the seeds to be distributed, the suction hole emerging on a channel with a width smaller than the diameter of the suction hole, the channel being open up to the periphery of the disc. A single-seeder can include at least one distribution box.

13 Claims, 4 Drawing Sheets

(56) References Cited

U.S. PATENT DOCUMENTS

| | | | |
|---|---|---|---|
| 9,265,191 B2 * | 2/2016 | Sauder | A01C 7/046 |
| 2005/0150442 A1 | 7/2005 | Friesen | |
| 2005/0204972 A1 | 9/2005 | Eben et al. | |
| 2006/0266269 A1 | 11/2006 | Eben et al. | |
| 2010/0077948 A1 | 4/2010 | Horsch | |
| 2010/0300341 A1 | 12/2010 | Peterson et al. | |
| 2010/0300342 A1 | 12/2010 | Peterson et al. | |
| 2014/0311391 A1 | 10/2014 | Audigie et al. | |

OTHER PUBLICATIONS

International Search Report Issued Sep. 12, 2013 in PCT/FR13/051210 Filed May 30, 2013.

* cited by examiner

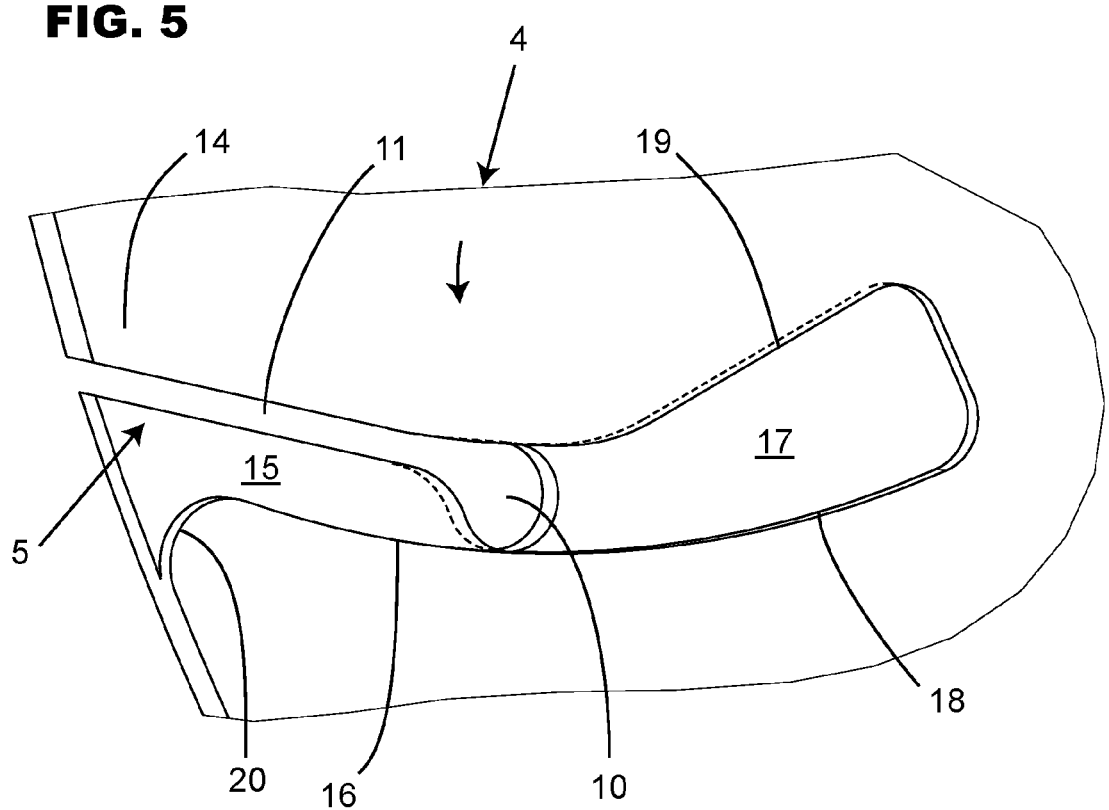

DISTRIBUTION BOX FOR SINGLE-SEED SEED DRILL WITH OPEN GROOVES AND SEED DRILL USING SUCH A BOX

BACKGROUND OF THE INVENTION

1. Field of the Invention

The present invention relates to the general technical field of agricultural machinery. The invention relates to a distribution box for a single-seeder with a distribution disc provided with radial grooves that are regularly spaced apart and open on the periphery of said disc, said disc being rotatably mounted on a horizontal axis and separating a seed reservoir from a suction device such that the seeds are picked up from the reservoir by said disc via the air flow by negative pressure and are held over at least part of their angular travel until they are expelled from a discharge opening.

2. Description of the Related Art

Such a distribution box for a single-seeder is described in application DE 10 2008 037 397 A1. This distribution box comprises a rotary planar disc mounted on a horizontal axis. The disc selects seeds owing to an air flow making it possible to suck and hold the seed over part of its rotation. To that end, it has outwardly open radial grooves. The diameter of the grooves is identical over its entire length and has a size smaller than that of the seeds. Thus, the seeds are sucked, then held on the grooves by depression. During the rotation of the disc, the seeds are gradually brought toward the periphery of the disc, and therefore to the opening of the groove to be released. Distributing calibrated seeds with a regular shape using such a disc makes it possible to obtain good results. The choice of the disc, with a width of the grooves adapted to the size of the seeds, is easier, since the batch of seeds is homogenous. The sorted seeds better adapt to the dimensions of the grooves, and the number of deficiencies or duplications is very low.

However, when the shape of the seeds is irregular or unsuitable, the disc, via the grooves, does not manage to remove the seeds from the reservoir or two seeds are inserted, which leads to more deficiencies and/or duplications. The precision of the sowing is therefore altered.

Furthermore, the presence of the cavity at the groove makes the discharge of the seeds more difficult, since the seed is too engaged in the groove. The seeds do not slide over the groove regularly, and consequently the spacing between the seeds in the furrow is deteriorated.

BRIEF SUMMARY OF THE INVENTION

The present invention aims to resolve the aforementioned drawbacks. It in particular proposes a distribution box for a single-seeder that allows effective selection and regular distribution regardless of the shape of the seeds.

To that end, an important feature of the invention consists in that each groove has a suction hole with a size smaller than that of the seeds to be distributed, said suction hole emerges on a channel with a width smaller than the diameter of the suction hole, said channel is open up to the periphery of the disc. Owing to this original groove, the distribution of the seeds is regular and precise, since it does not depend on the shape or size of the seeds. Furthermore, the sowing is done without duplicate seeds and without deficiencies. In fact, the suction hole with a size adapted to the seed guarantees a proper selection of the seeds and the channel ensures sliding of the seed to the periphery of the disc, where the seed is then expelled. The channel makes it possible to press the seed against the disc and guide the sliding of the seed until it is expelled. The presence of the channel limits the suction force that keeps the seed on the disc, which will facilitate the expulsion of the seed. This distribution therefore allows sowing with a very low number of deficiencies, even with a heterogeneous batch of seeds. A regular and constant spacing between the seeds deposited in the furrow is thus ensured.

BRIEF DESCRIPTION OF THE SEVERAL VIEWS OF THE DRAWINGS

Other features and advantages of the invention will emerge from the following description in light of the appended drawings, which are provided solely as non-limiting examples of the invention. In these drawings:

FIG. 5 is a larger scale view of a groove according to another embodiment of the invention arranged in the disc.

DETAILED DESCRIPTION OF THE INVENTION

Figure 1:
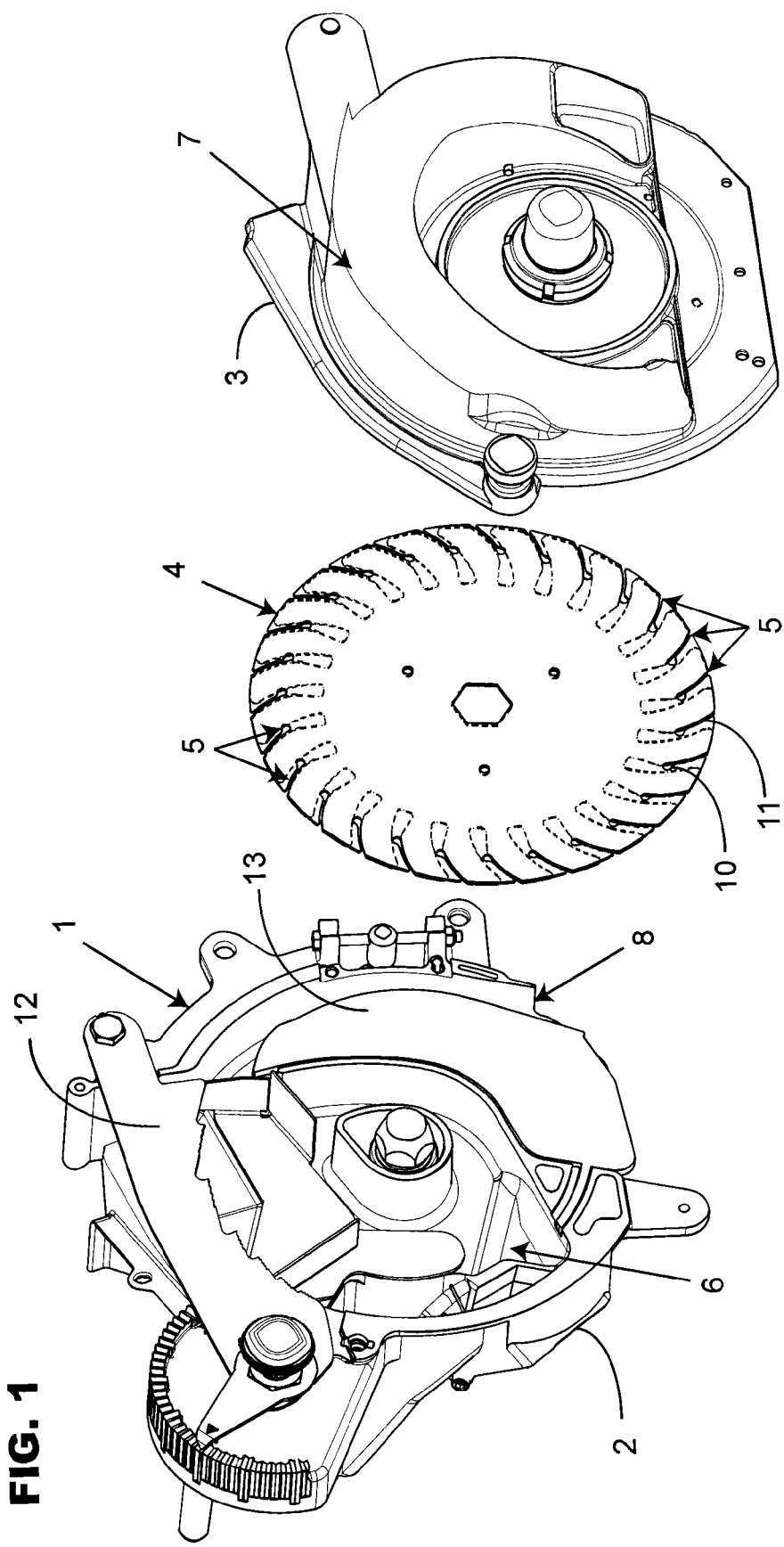
FIG. 1 shows an exploded perspective view of a distribution box for a single-seeder according to the present invention.

FIG. 1 shows an exploded perspective view of a distribution box (1) according to the invention. Such a box (1) is generally found on a single-seeder that distributes the seeds one by one along the planting row. Such a single-seeder is made up of a chassis, which may or may not be foldable, that carries sowing elements. The chassis is designed so as to modify the spacing between the sowing elements. Each sowing element has its individual hopper or its remotely supplied hopper, its distribution, and its burying, tamping, covering and depth control elements. Each sowing element is respectively mounted on the chassis using a deformable parallelogram, which allows the sowing element to remain parallel to the ground in all positions. The distribution or the distribution box (1) serves to remove the seeds from the hopper one by one and distribute them at regular intervals along the row. The hopper constitutes the reserve of seeds and normally supplies one row. As an example, such single-seeders are described in patent applications FR 2 820 605, FR 2 964 823 and FR 2 920 266.

The distribution box (1) comprises a casing (2) with a generally cylindrical shape and a cover (3). Each distribution box (1) comprises a disc (4) provided with grooves (5) arranged at regular intervals over a diameter close to the periphery. The grooves (5) are radial, regularly spaced apart and open over the periphery of the disc (4). The number of grooves (5) is adapted to the species of seed, i.e., the size and shape of the seeds. The grooves are situated near the periphery of the disc (4). Said disc (4) is rotatably mounted in the casing (2). In the example embodiment, the disc (4) is planar, small and thin. It is made to rotate in a substantially vertical plane, and its axis of rotation (4a) is substantially horizontal. The disc (4) separates a seed reservoir (6) from a suction device (7) such that the seeds are picked up from the reservoir (6) by the disc (4) via an air flow by negative pressure. The air flow for seed selection is produced by a turbine driven by the power take-off of the tractor. The turbine can be replaced by a hydraulic or electric motor.

During the rotation of the disc (4), the seeds are held over at least part of their angular movement by the air flow by negative pressure until they are expelled from the discharge opening (8). A drop tube (9) associated with the discharge opening (8) makes it possible to convey the selected seeds toward the ground. Burying elements associated with the drop tube (9) create a furrow with a predetermined depth in order to place the seeds therein and cover them with earth. At the discharge opening (8), the seeds are released one by one with regular spacing, which makes it possible to place them at a constant interval along the row.

According to an important feature of the invention, each groove (5) has a suction hole (10) smaller than the size of the seeds to be distributed, said suction hole (10) emerging on a channel (11) with a width smaller than the diameter of the suction hole (10), said channel (11) is open up to the periphery of the disc (4). Owing to that groove (5), made by a suction hole emerging on a narrow channel (11), the distribution of the seeds is regular and precise. In fact, the suction hole (10) performs the selection of the seeds and the narrower channel (11) guides the seed up to the periphery of the disc, where it is released.

Figure 2:
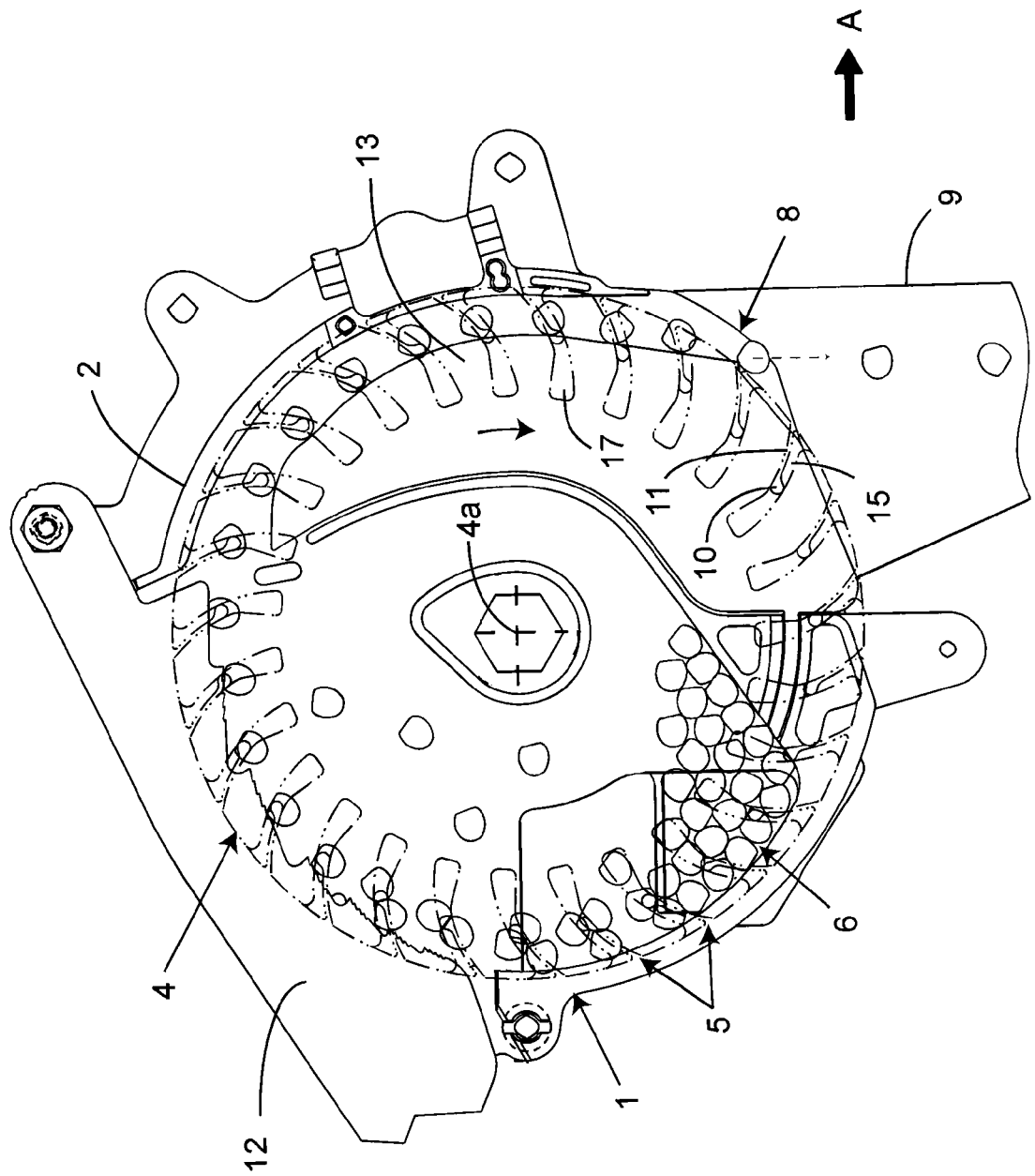
FIG. 2 is a diagrammatic view illustrating the operation of the distribution box.

FIG. 2 illustrates the operation of the distribution box (1) according to the present invention. During the rotation of the disc (4), the seeds are taken from the bottom of the box (1) via the grooves (5) subjected to the air flow by negative pressure and are released from the discharge opening (8). The disc (4) plunges in the bottom of box (1) and rotates, taking away seeds on the grooves (5). The seeds are held by depression on the grooves (5) over at least part of their angular movement. The grooves (5) are subjected to this depression until they reach the vicinity of the seed discharge opening (8). The disc (4) rotates clockwise. The disc (4) is driven in rotation via driving elements based on the speed of forward motion of the seeder. Thus, the distribution speed is adapted to the speed of forward motion of the seeder, which makes it possible to sow the seeds with constant spacing. The disc (4) can also be driven by an electric motor.

Additionally to the disc (4), the distribution box (1) comprises a selector (12) and an ejector (13). Owing to this equipment, the selection of a single seed per groove (5) and the ejection of that seed are perfectly controlled. The selector (12) is placed tangentially relative to the suction holes (10). It is a plate whereof the lower edge is configured so as to form a series of inclined ramps cut into saw teeth. The series of ramps makes it possible to eliminate the duplicate seeds located around each groove (5). The direction of advance of the seeder is embodied by arrow (A) in FIG. 2. In the rest of the description, the notions "forward" and "rear" are defined relative to this direction of advance (A). The selector (12) extends substantially in the upper rear quadrant of the casing (2). The ejector (13) is made up of a guide that serves on the one hand to cause the seed to slide toward the periphery of the disc (4) and on the other hand to facilitate its release. The ejector (13) extends in the front half of the casing (2). During the rotation of the disc (4), the seeds arriving at the discharge opening (8) are pushed on the periphery of the disc (4) by the guide. At this level, the depression ceases behind the disc (4), which releases the seeds one by one. In order to force the release of the seeds, the grooves (5) pass in the trajectory of the guide. FIG. 2 diagrammatically shows a seed that has just been released, which is going to fall into the drop tube (9). Its fall will take place quasi-vertically. Owing to the mechanical ejection of the seeds, the expulsion time and the trajectory of the seeds are controlled and the placement of the seeds in the furrow is regular and precise.

Figure 3:
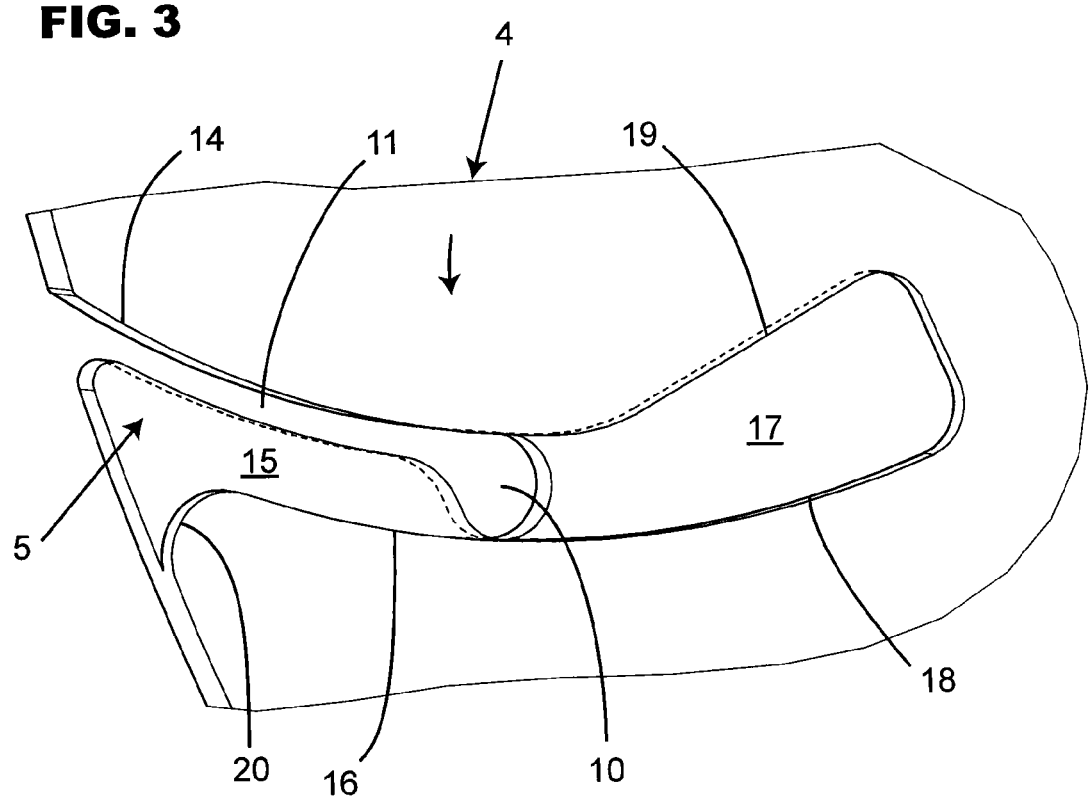
FIG. 3 is a larger scale view of a groove according to the invention arranged in the disc.

FIG. 3 provides a more detailed view of a groove (5) arranged in the disc (4), on the side of the disc (4) intended to receive the seeds. Each groove (5) is made up of a suction hole (10) and a channel (11) that passes through the entire thickness of the disc (4). The suction hole (10) has a circular section, the diameter of which is adapted to the size and weight of the seeds so that the depression is effective. The diameter of the suction hole (10) is smaller than the diameter of the seeds. Preferably, the suction hole (10) has a diameter that corresponds to approximately half of the average diameter of the seeds. The channel (11) is made in the form of an oblong hole that is open over the periphery of the disc (4). The diameter of the oblong hole or the width of the channel (11) is smaller than the diameter of the suction hole (10). The width dimension of the channel (11) is smaller than half of the diameter of the suction hole (10). Advantageously and as illustrated in FIG. 3, the width dimension of the channel (11) represents approximately one third of the diameter of the suction hole (10). The channel (11) is tangent to the rear of the suction hole (10), taking account of the direction of rotation of the disc (4). The channel (11) begins at the suction hole (10) and continues toward the periphery of the disc (4) rectilinearly or with a curve having a large radius, as shown in FIG. 5. Preferably and according to the illustrated embodiment, the channel (11) is curved toward the periphery of the disc (4). The curve is oriented toward the rear, taking account of the direction of rotation of the disc (4). This orientation of the curve allows a quasi-vertical release of the seeds from the discharge opening (8). The channel (11) has a rear edge (14) protruding on the seed side, taking account of the direction of rotation of the disc (4). This rear edge (14) defines a ramp for guiding and sliding seeds from the suction hole (10) toward the periphery of the disc (4). The guide ramp is continuous and follows the profile of the channel (11). The channel (11) makes it possible to press the seed against the disc (4) and the rear edge (14), and thus to guide the sliding of the seed until it is expelled. The presence of the narrower channel (11) limits the suction force that holds the seed on the disc (4) and facilitates the expulsion of the seed from the discharge opening (8). The regular and constant separation between the seeds positioned in the furrow is therefore ensured.

Figure 4:
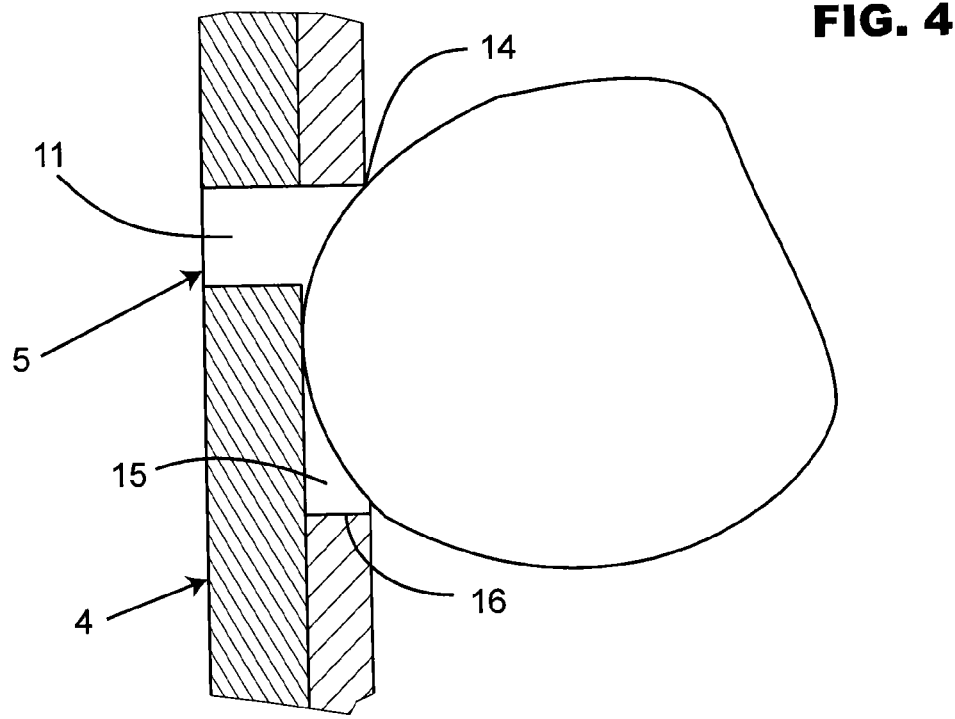
FIG. 4 is a view of the edge of the disc at a groove.

According to FIG. 3, the groove (5) also comprises a hollow (15). The hollow (15) is arranged in part of the thickness of the disc (4). The hollow (15) is made on the face on the seed side of the disc (4). The hollow (15) is tangent to the front of the suction hole (10), taking account of the direction of rotation of the disc (4). It begins at the suction hole (10) and continues toward the periphery of the disc (4). The hollow (15) delimits a front edge (16). The front edge (16) has substantially the same profile as the rear edge (14) of the channel (11). FIG. 4 shows the edge of the disc (4) at a groove (5), and in particular at the channel (11). A seed is held on that groove (5) by suction. The hollow (15) prevents the seeds from becoming embedded in the channel (11) and provides a bearing plane for the seeds. Owing to the channel (11) and the hollow (15), the groove (5) is less sensitive to the size and shape variation of the seeds. This distribution therefore allows a seeding where the number of deficiencies and/or duplicate seeds is very low, even with a batch of heterogeneous seeds.

As shown in FIG. 3, the groove (5) has, at the periphery of the disc (4), a recess (20) on its front part taking account of the direction of rotation of the disc (4). This recess (20) with a rounded shape prevents the seed that is released from touching the disc (4) during its quasi-vertical ejection and following another trajectory.

It will be noted that the groove (5) also comprises a stirring device (17) that carries out a mixing of the seeds contained in the bottom of the box (1). The hollows (15) and the stirring devices (17) are illustrated in broken lines in FIG. 1, since they are made in the surface of the disc (4) intended to be in contact with the casing (2) on the side of the seeds. The stirring device (17) is adjacent to the suction hole (10) and extends toward the center of the disc (4). The arrangement of the stirring device (17) on the disc (4) must not hinder the engagement of the seeds in the bottom of the box (1). The stirring device (17) is made in the form of a recess arranged in the thickness of the disc (4) on the seed side. This recess in the surface of the disc (4) delimits a front face (18) and a rear face (19). The front face (18) is tangent at the front of the suction hole (10) and extends the front edge (16), along the same profile. In the illustrated example, the front edge (16) and the front face (18) have a curve identical to that of the channel (11) and the rear edge (14). The rear face (19) has a tangent connection at the rear of the suction hole (10) and is oriented toward the axis of rotation of the disc (4) moving away from the front face (18). With these stirring devices (17), the seeds contained in the bottom of the box (1) are mixed due to the rotation of the disc (4), which prevents the formation of a settling arch. In this way, the application of the seeds on the suction holes (10) is favored and regular sowing is ensured without deficiencies. The number of stirring devices (17) distributed on the disc (4) is adapted to the type of seeds to be sown. For some seeds, such as beets, the presence of a stirring device (17) is not necessary.

In the example embodiment shown in FIG. 3, the disc (4) is made in a single piece. In one alternative, the disc is made in several pieces. FIG. 4 shows another example embodiment in which the disc (4) is made in two parts. The two parts can be joined by adhesion.

The invention is applicable in the field of seeders and single seeders. In general, the invention relates to an agricultural machine that is intended to work on parallel lines or rows that are spaced apart with a certain spacing.

The invention is of course not limited to the embodiments described above and shown in the appended drawings. Modifications remain possible, in particular regarding the composition or number of the various elements or by substituting technical equivalents, without, however, departing from the scope of protection as defined by the following claims.

The invention claimed is:

1. A distribution box for a single-seeder comprising:
   a disc comprising radial grooves that are regularly spaced apart and open on a periphery of the disc,
   the disc being rotatably mounted on a horizontal axis and separating a seed reservoir from a suction device such that seeds are picked up from the reservoir by the disc via air flow by negative pressure and are held over at least part of their angular travel until the seeds are expelled from a discharge opening,
   wherein each groove includes a suction hole with a size smaller than that of the seeds to be distributed, the suction hole emerges on a channel, with said channel having a width smaller than a diameter of the suction hole, and the channel is open up to the periphery of the disc.

2. A box according to claim 1, wherein the channel is tangent at a rear of the suction hole, taking account of a direction of rotation of the disc, and a direction of the channel is curved or rectilinear up to the periphery of the disc.

3. A box according to claim 1, wherein a rear edge that protrudes on a seed side of the channel, taking account of a direction of rotation of the disc, defines a ramp for guiding and sliding seeds from the suction hole toward the periphery of the disc, the guide ramp follows a profile of the channel.

4. A box according to claim 1, wherein a width dimension of the channel is smaller than half of the diameter of the suction hole.

5. A box according to claim 1, wherein the channel extends through an entire thickness of the disc.

6. A box according to claim 2, wherein the channel is curved toward the periphery of the disc, and the curve is oriented toward a rear taking account of a direction of rotation of the disc.

7. A box according to claim 1, wherein each groove further comprises a hollow as a bearing plane for the seeds.

8. A box according to claim 1, wherein each groove includes a stirring device adjacent to the suction hole, the stirring device extending toward a center of the disc.

9. A box according to claim 1, wherein the stirring device is made in a form of a recess arranged on a seed side of the disc, the recess delimiting a front face and a rear face.

10. A box according to claim 9, wherein the front face is tangent at a front of the suction hole and has a profile substantially identical to that of the channel and the rear face has a connection tangent at a rear of the suction hole and is oriented toward an axis of rotation of the disc moving away from the front face.

11. A box according to claim 1, wherein the groove includes, at the periphery of the disc, a recess on a front part of the groove taking account of a direction of rotation of the disc.

12. A box according to claim 1, wherein the disc is made in one or plural parts.

13. A pneumatic single-seeder, comprising at least one distribution box according to claim 1.

* * * * *

UNITED STATES PATENT AND TRADEMARK OFFICE
CERTIFICATE OF CORRECTION

PATENT NO. : 9,491,900 B2  
APPLICATION NO. : 14/403843  
DATED : November 15, 2016  
INVENTOR(S) : Audigie et al.

Page 1 of 1

It is certified that error appears in the above-identified patent and that said Letters Patent is hereby corrected as shown below:

On the Title Page

Item (72) Inventors, please change "Veckersville" to --Veckersviller--.

Signed and Sealed this  
Seventeenth Day of April, 2018

Andrei Iancu  
*Director of the United States Patent and Trademark Office*